(12) United States Patent
Kim et al.

(10) Patent No.: US 9,086,773 B2
(45) Date of Patent: Jul. 21, 2015

(54) TOUCHSCREEN DEVICE AND METHOD OF PROCESSING TOUCH DATA

(71) Applicant: SAMSUNG ELECTRO-MECHANICS CO., LTD., Suwon (KR)

(72) Inventors: Ji Hoon Kim, Suwon (KR); Sang Hyun Sim, Suwon (KR); Hyun Suk Lee, Suwon (KR)

(73) Assignee: SAMSUNG ELECTRO-MECHANICS CO., LTD., Suwon (KR)

( * ) Notice: Subject to any disclaimer, the term of this patent is extended or adjusted under 35 U.S.C. 154(b) by 22 days.

(21) Appl. No.: 14/162,197

(22) Filed: Jan. 23, 2014

(65) Prior Publication Data

US 2015/0138134 A1    May 21, 2015

(30) Foreign Application Priority Data

Nov. 20, 2013 (KR) ........................ 10-2013-0141276

(51) Int. Cl.
*G06F 3/044* (2006.01)
(52) U.S. Cl.
CPC ..................................... *G06F 3/044* (2013.01)
(58) Field of Classification Search
CPC ....... G06F 3/044; G06F 3/045; G06F 3/0412; G06F 3/416; G06F 3/046
See application file for complete search history.

(56) References Cited

U.S. PATENT DOCUMENTS

| | | | | |
|---|---|---|---|---|
| 2012/0200523 A1* | 8/2012 | Westhues | ...................... | 345/174 |
| 2012/0287081 A1* | 11/2012 | Akai et al. | .................... | 345/174 |
| 2012/0327097 A1* | 12/2012 | Mostafa et al. | ............... | 345/555 |
| 2013/0027347 A1 | 1/2013 | Doi et al. | | |

FOREIGN PATENT DOCUMENTS

| | | |
|---|---|---|
| KR | 10-2005-0051029 | 6/2005 |
| KR | 10-2013-0014420 | 2/2013 |

* cited by examiner

*Primary Examiner* — Kevin Nguyen

(57) ABSTRACT

There are provided a touchscreen device and a method of processing touch data. The touchscreen device includes: a panel unit including rows of first electrodes extending in a first direction and columns of second electrodes extending in a second direction intersecting the first direction; a sensing circuit unit sensing changes in capacitance in intersections of the first electrodes and the second electrodes; a signal conversion unit converting the changes in capacitance into a digital signal; and an operation unit creating a binary image in a matrix form having rows of the first electrodes and columns of the second electrodes based on the digital signal, and projecting the binary image onto every first electrode and every second electrode in the first and second directions, respectively, to create a projection mask including a plurality of bit masks.

16 Claims, 12 Drawing Sheets

FIG. 6

|  | | Y1 | Y2 | Y3 | Y4 | Y5 | Y6 | Y7 | Y8 | Y9 | Y10 | Y11 | Y12 | Y13 | Y14 | Y15 | Y16 | Y17 | Y18 |
|---|---|---|---|---|---|---|---|---|---|---|---|---|---|---|---|---|---|---|---|
|  |  | 0 | 2 | 4 | 3 | 1 | 0 | 0 | 0 | 0 | 1 | 2 | 4 | 2 | 0 | 1 | 3 | 4 | 2 |
| X1 | 0 | | | | | | | | | | | | | | | | | | |
| X2 | 2 | | | 1 | 1 | | | | | | | | | | | | | | |
| X3 | 4 | | 1 | 1 | 1 | 1 | | | | | | | | | | | | | |
| X4 | 3 | | 1 | 1 | 1 | | | | | | | | | | | | | | |
| X5 | 1 | | | 1 | | | | | | | | | | | | | | | |
| X6 | 0 | | | | | | | | | | | | | | | | | | |
| X7 | 0 | | | | | | | | | | | | | | | | | | |
| X8 | 1 | | | | | | | | | | | | 1 | | | | | | |
| X9 | 4 | | | | | | | | | | 1 | 1 | 1 | 1 | | | | | |
| X10 | 3 | | | | | | | | | | | 1 | 1 | 1 | | | | | |
| X11 | 1 | | | | | | | | | | | | 1 | | | | | | |
| X12 | 0 | | | | | | | | | | | | | | | | | | |
| X13 | 0 | | | | | | | | | | | | | | | | | | |
| X14 | 0 | | | | | | | | | | | | | | | | | | |
| X15 | 2 | | | | | | | | | | | | | | | | 1 | 1 | |
| X16 | 4 | | | | | | | | | | | | | | | 1 | 1 | 1 | 1 |
| X17 | 3 | | | | | | | | | | | | | | | | 1 | 1 | 1 |
| X18 | 1 | | | | | | | | | | | | | | | | 1 | | |

PROJECTION MASK    BINARY IMAGE

TOUCHSCREEN DEVICE AND METHOD OF PROCESSING TOUCH DATA

CROSS-REFERENCE TO RELATED APPLICATION

This application claims the benefit of Korean Patent Application No. 10-2013-0141276 filed on Nov. 20, 2013, with the Korean Intellectual Property Office, the disclosure of which is incorporated herein by reference.

BACKGROUND

The present disclosure relates to a touchscreen device and a method of processing touch data.

A touch sensing device such as a touchscreen or a touch pad is attached to a display device to provide an intuitive method of data input to a user and has recently been widely used in various electronic devices such as cellular phones, personal digital assistants (PDA) and navigation devices. In particular, as the demand for smartphones has increased recently, touchscreens have been increasingly used therein as touch sensing devices able to provide various methods of data input in a limited form factor.

Touchscreens used in portable devices may be mainly divided into resistive type touchscreens and capacitive type touchscreens, depending on the way in which a touch is sensed therein. Among these, capacitive type touchscreens have the advantages of a relatively long lifespan and the ease of implementing various input manners and gestures, and thus has been increasingly employed. It is especially easy to implement a multi-touch interface with a capacitive type touchscreen, as compared to a resistive type touchscreen, and thus capacitive type touchscreens are widely used in smartphones and the like.

The capacitive type touchscreen includes a plurality of electrodes having a predetermined pattern and the electrodes define a plurality of nodes in which changes in capacitance are generated due to touches. The nodes deployed on a two-dimensional plane generate changes in self-capacitance or changes in mutual-capacitance due to touches. Coordinates of touches may be calculated by applying a weighted average method or the like to the changes in the capacitance generated in the nodes.

Recently, research into a touchscreen device which is more sensitive to a user's touch is on-going. To this end, an algorithm allowing for rapid detection of a touch is required.

RELATED ART DOCUMENT (Patent Document 1) Korean Patent Laid-Open Publication No. 2013-0014420

SUMMARY

An aspect of the present disclosure may provide a touchscreen device and a method of processing touch data in which a binary image is created based on a digital signal, touch candidate regions are calculated according to data values existing in the created binary image, and it is determined whether a touch has occurred by way checking only some touch candidate regions instead of checking all touch candidate regions.

According to an aspect of the present disclosure, a touchscreen device may include: a panel unit including rows of first electrodes extending in a first direction and columns of second electrodes extending in a second direction intersecting the first direction; a sensing circuit unit sensing changes in capacitance in intersections of the first electrodes and the second electrodes; a signal conversion unit converting the changes in capacitance into a digital signal; and an operation unit creating a binary image in a matrix form having rows of the first electrodes and columns of the second electrodes based on the digital signal, and projecting the binary image onto every first electrode and every second electrode in the first and second directions, respectively, to create a projection mask including a plurality of bit masks, the operation unit selecting as touch candidate regions a plurality of sub images consisting of common regions between the bit masks for the first electrodes having a value of 1 or higher and the bit masks for the second electrodes having a value of 1 or higher, to determine whether a touch has occurred.

The operation unit may select one sub image from the plurality of sub images, check all pixels in the selected sub image, and, if a pixel has a data value, decrease a value of a bit mask corresponding to the pixel.

The operation unit may decrease values of bit masks for the first electrode and for the second electrode corresponding to the pixel.

The operation unit may select one sub image from the plurality of sub images based on touch information in a previous frame.

The operation unit may check pixels in the selected sub images and determine the selected sub image as a touch region if a data value exists in a pixel.

The operation unit may check pixels in the selected sub image and, if a data value exists in a pixel, determine that a touch has occurred at an intersection of the first electrodes and the second electrodes which correspond to the pixel.

The operation unit, if a value of at least one of the plurality of the bit masks is changed to zero, may exclude a part or the entire of at least one sub image corresponding to the bit mask from the touch candidate regions.

According to another aspect of the present disclosure, a method of processing touch data may include creating a binary image based on changes in capacitance generated in intersections of rows of first electrodes extending in a first direction and columns of second electrodes extending in a second direction intersecting the first direction; projecting the binary image onto every first electrode and every second electrode in the first and second directions, respectively, to create a projection mask including a plurality of bit masks; selecting as touch candidate regions a plurality of sub images corresponding to common regions between the bit masks for the first electrodes having a value of 1 or higher and the bit masks for the second electrodes having a value of 1 or higher in the projection mask; and determining whether a touch has occurred by checking pixels in the touch candidate regions to determine if a data value exists therein.

The creating of the binary image may include creating the binary image based on a digital signal converted from the changes in capacitance.

The binary image may be in a matrix form having rows of the first electrodes and columns of the second electrodes.

The determining of whether a touch has occurred may include: selecting a sub image from the touch candidate regions; and if a data value exists in a pixel in the selected sub image, decreasing a value of a bit mask corresponding to the pixel.

The determining whether a touch has occurred may further include, if a value of at least one of the plurality of the bit masks is changed to zero, excluding a part or the entire of at least one sub image corresponding to a bit mask having a value changed to zero from the touch candidate regions.

The determining whether a touch has occurred may further include determining whether values of all of the plurality of the bit masks have been changed to zero.

The determining whether a touch has occurred may further include, if at least one of the plurality of bit masks has value of 1 or higher, repeating the selecting of the sub image and the decreasing of the value of the bit mask.

The decreasing of the value of the bit mask may include decreasing values of bit masks for the first electrode and for the second electrode corresponding to the pixel.

The selecting of the sub image may include selecting one sub image from the plurality of sub images based on touch information in a previous frame.

BRIEF DESCRIPTION OF DRAWINGS

The above and other aspects, features and other advantages of the present disclosure will be more clearly understood from the following detailed description taken in conjunction with the accompanying drawings, in which:

FIGS. 6 through 10A and 10B are diagrams for illustrating the method of processing touch data according to the exemplary embodiment of FIG. 5.

DETAILED DESCRIPTION

Figure 1:
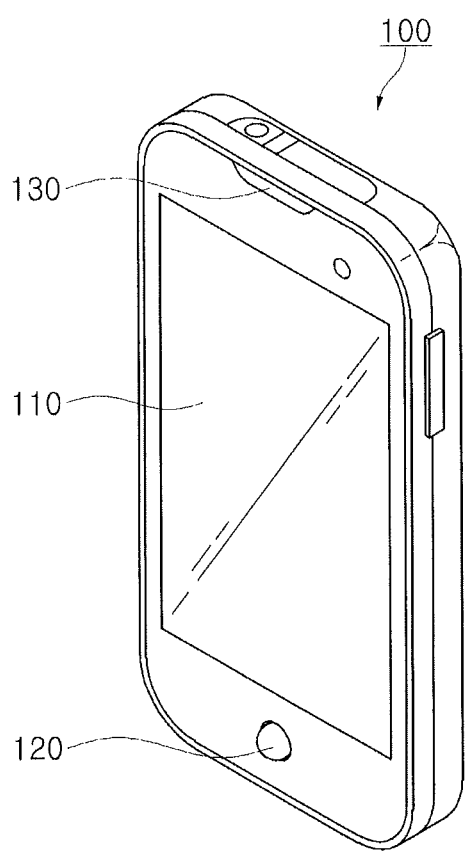
FIG. 1 is a perspective view illustrating an appearance of an electronic device including a touchscreen device according to an exemplary embodiment of the present disclosure.

Hereinafter, embodiments of the present disclosure will be described in detail with reference to the accompanying drawings. The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art. In the drawings, the shapes and dimensions of elements may be exaggerated for clarity, and the same reference numerals will be used throughout to designate the same or like elements.

FIG. 1 is a perspective view illustrating an appearance of an electronic device including a touchscreen device according to an exemplary embodiment of the present disclosure. Referring to FIG. 1, the electronic apparatus 100 according to the exemplary embodiment of the present disclosure may include a display device 110 for outputting an image, an input unit 120, an audio unit 130 for outputting sound, and a touchscreen device integrated with the display device 110.

As shown in FIG. 1, it is common in mobile devices that a touchscreen device is integrated with a display device, and such a touchscreen device needs to have a degree of light transmittance sufficient to allow an image displayed on the display device to be viewed by a user. Therefore, the touchscreen device may be implemented by forming a sensing electrode using a transparent and electrically conductive material such as indium tin oxide (ITO), indium zinc oxide (IZO), zinc oxide (ZnO), carbon nanotubes (CNT), or graphene on a base substrate formed of a transparent film material such as polyethylene terephthalate (PET), polycarbonate (PC), polyethersulfone (PES), polyimide (PI), polymethylmethacrylate (PMMA), or the like. The display device may include a wiring pattern disposed in a bezel region thereof, in which the wiring pattern is connected to the sensing electrode formed of the transparent and conductive material. Since the wiring pattern is hidden by the bezel region, it may be formed of a metal such as silver (Ag) or copper (Cu).

Since the touchscreen device according to the exemplary embodiment is of a capacitive type, the touchscreen device may include a plurality of electrodes having a predetermined pattern. Further, the touchscreen device may include a capacitance sensing circuit to sense changes in capacitance generated in the plurality of electrodes, an analog-digital conversion circuit to convert an output signal from the capacitance sensing circuit into a digital signal, and an operation circuit to determine whether a touch has occurred using the data converted into a digital signal.

Figure 2:
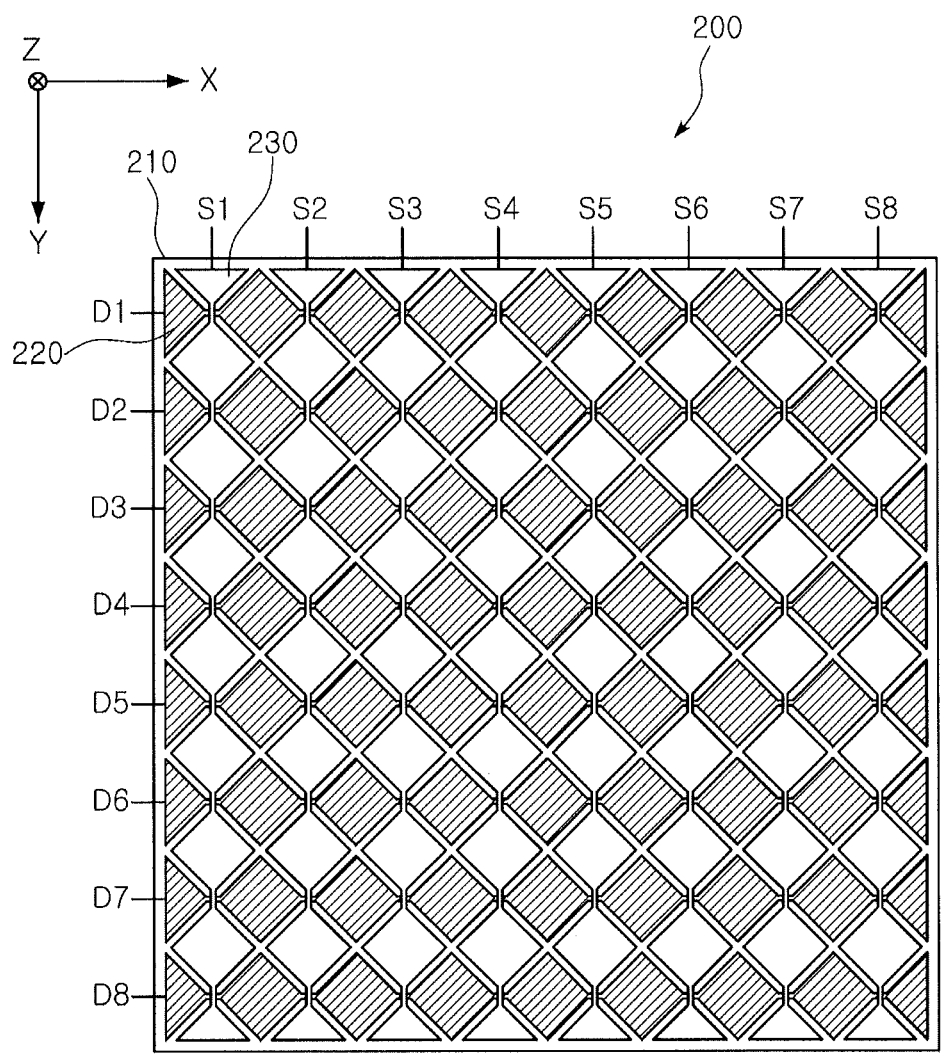
FIG. 2 is a view of a panel unit included in a touchscreen device according to an exemplary embodiment of the present disclosure.

FIG. 2 is a view of a panel unit included in a touchscreen device according to an exemplary embodiment of the present disclosure.

Referring to FIG. 2, the panel part 200 according to the exemplary embodiment includes a substrate 210 and a plurality of electrodes 220 and 230 provided on the substrate 210. Although not shown in FIG. 2, each of the plurality of electrodes 220 and 230 may be electrically connected to a wiring pattern on a circuit board attached to one end of the substrate 210 through wiring and a bonding pad. The circuit board may have a controller integrated circuit mounted thereon so as to detect sensing signals generated in the plurality of electrodes 220 and 230 and may determine whether a touch has occurred based on the detected sensing signals.

The plurality of electrodes 220 and 230 may be formed on one surface or both surfaces of the substrate 210. Although the plurality of electrodes 220 and 230 are shown to have a lozenge- or diamond-shaped pattern in FIG. 2, the plurality of electrodes 220 and 230 may have a variety of polygonal shapes such as rectangular and triangular shapes.

The plurality of electrodes 220 and 230 may include first electrodes 220 extending in the x-axis direction, and second electrodes 230 extending in the y-axis direction. The first electrodes 220 and the second electrodes 230 may be provided on both surfaces of the substrate 210 or may be provided on different substrates 210 such that they intersect with each other. If all of the first electrodes 220 and the second electrodes 230 are provided on a single surface of the substrate 210, an insulating layer may be partially formed at intersection points between the first electrodes 220 and the second electrodes 230. In addition to the region in which the plurality of electrodes 220 and 230 are formed, a printed region may be formed in the region of the substrate 210 in which wirings connecting to the plurality of electrodes 220 and 230 are provided, in order to hide the wirings, typically formed of an opaque metal.

A device, which is electrically connected to the plurality of electrodes 220 and 230 to sense a touch, detects changes in capacitance generated in the plurality of electrodes 220 and 230 by a touch to sense the touch based on the detected change in capacitance. The first electrodes 220 may be connected to channels defined as D1 to D8 in the controller integrated circuit to receive predetermined driving signals, and the second electrodes 230 may be connected to channels defined as S1 to S8 to be used by the touchscreen device to detect a sensing signal.

Here, the controller integrated circuit may detect changes in mutual-capacitance generated between the first and second electrodes 220 and 230 as the sensing signal, in such a manner that the driving signals are sequentially applied to the first electrodes 220 and changes in capacitance are simultaneously detected from the second electrodes 230.

Figure 3:
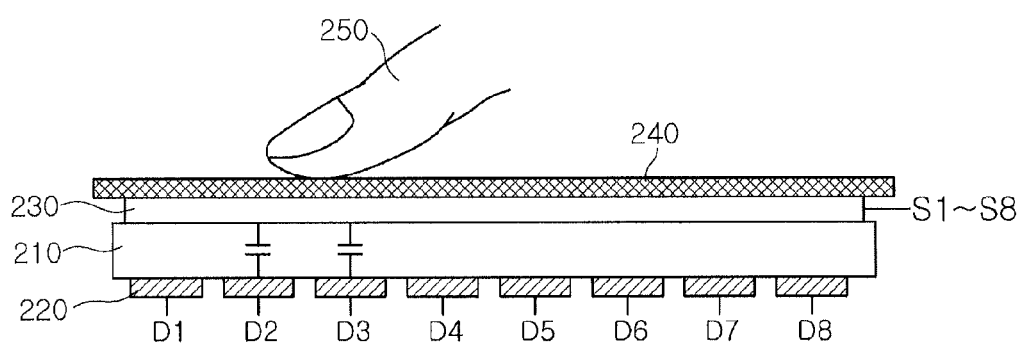
FIG. 3 is a cross-sectional view of a panel unit included in a touchscreen device according to an exemplary embodiment of the present disclosure.

FIG. 3 is a cross-sectional view of a panel unit included in a touchscreen device according to an exemplary embodiment of the present disclosure. FIG. 3 is a cross-sectional view of the panel unit 200 illustrated in FIG. 2 taken on the y-z plane, in which the panel unit 200 may further include a cover lens 240 that is touched, in addition to the substrate 210 and the plurality of sensing electrodes 220 and 230 described above. The cover lens 240 is provided on the second electrodes 230 used in detecting sensing signals, to receive a touch from a touching object 250 such as a finger.

When driving signals are sequentially applied to the first electrodes 320 though the channels D1 to D8, mutual-capacitance is generated between the first electrodes 220, to which the driving signals are applied, and the second electrodes 230. When the driving signals are sequentially applied to the first electrodes 220, changes in mutual-capacitance generated between the first electrode 220 and the second electrodes 230 occur around the area with which the touching object 250 comes into contact. The changes in mutual-capacitance may be proportional to the area of the region in which the first electrodes 220, which the contacting object 250 comes into contact with and the driving signals are applied to, and the second electrodes 230 overlap. In FIG. 3, the mutual-capacitance generated between the first electrodes 220 connected to channel D2 and D3, respectively, and the second electrodes 230 is influenced by the touching object 250.

Figure 4:
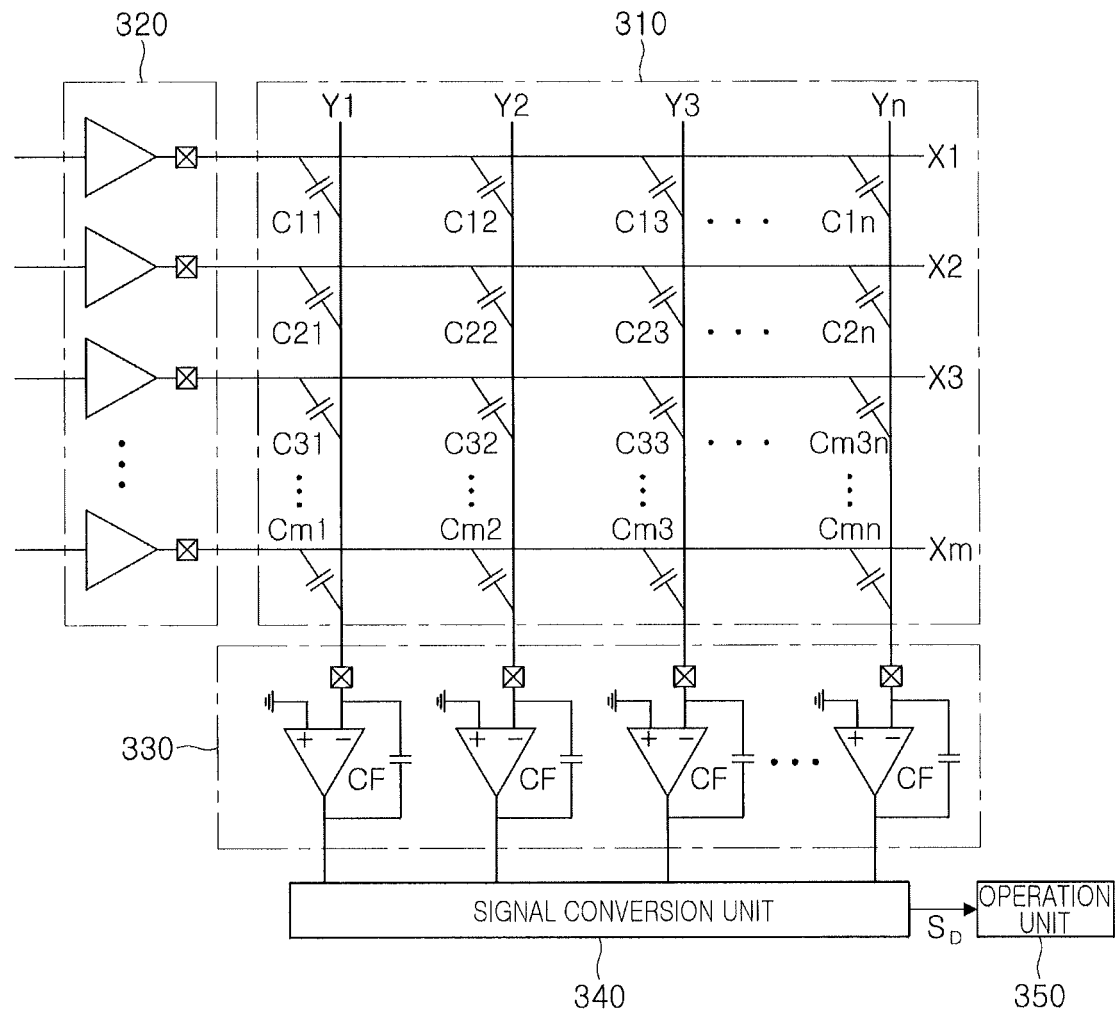
FIG. 4 is a diagram illustrating a touchscreen device according to an exemplary embodiment of the present disclosure.

FIG. 4 is a diagram illustrating a touchscreen device according to an exemplary embodiment of the present disclosure. Referring to FIG. 4, the touchscreen device according to the exemplary embodiment may include a panel unit 310, a driving circuit unit 320, a sensing circuit unit 330, a signal conversion unit 340, and an operation unit 350.

The panel unit 310 may include rows of first electrodes X1 to Xm extending in a first axial direction (that is, the horizontal direction of FIG. 4), and columns of second electrodes Y1 to Yn extending in a second axial direction (that is, the vertical direction of FIG. 4) crossing the first axial direction. Node capacitors C11 to Cmn are the equivalent representation of mutual capacitance generated in intersections of the first electrodes X1 to Xm and the second electrodes Y1 to Yn. The driving circuit unit 320, the sensing circuit unit 330, the signal converting unit 340, and the calculating unit 350 may be implemented as a single integrated circuit (IC).

The driving circuit unit 320 may apply predetermined driving signals to the first electrodes X1 to Xm of the panel unit 310. The driving signals may be square wave signals, sine wave signals, triangle wave signals or the like having a specific frequency and an amplitude and may be sequentially applied to the plurality of first electrodes. Although FIG. 4 illustrates that circuits for generating and applying the driving signals are individually connected to the plurality of first electrodes X1 to Xm, a single driving signal generating circuit may be used to apply the driving signals to the plurality of first electrodes by employing a switching circuit.

The sensing circuit unit 330 may sense changes in capacitance in the node capacitors C11 to Cmn from the plurality of second electrodes Y1 to Yn and may include a plurality of C-V converters, each of which includes at least one operational amplifier and at least one capacitor. The plurality of C-V converters may convert changes in capacitance of the node capacitors C11 to Cmn into a voltage so as to output it. For example, each of the plurality of C-V converters may integrate changes in capacitance to convert them into voltages.

Although each of the C-V converters 335 shown in FIG. 4 has a capacitor CF connected between the inverting input and the output of an operation amplifier, it is apparent that the circuit configuration may be altered. Moreover, each of the C-V converters 335 shown in FIG. 4 has one operational amplifier and one capacitor, it may have a number of operational amplifiers and capacitors to convert changes in capacitance into voltages and output the voltages.

When driving signals are applied to the first electrodes X1 to Xm sequentially, changes in capacitance of the capacitors C11 to Cmn may be detected simultaneously from the second electrodes, and thus the number of required C-V converts is equal to the number of the second electrodes Y1 to Yn, i.e., n.

The signal conversion unit 340 may generate a digital signal $S_D$ from the analog signals generated by the C-V converters. For example, the signal conversion unit 340 may include a time-to-digital converter (TDC) circuit measuring a time taken for analog signals in the form of voltages output from the sensing circuit unit 330 reach a predetermined reference voltage level to convert the measured time into the digital signal $S_D$, or an analog-to digital-converter (ADC) circuit measuring an amount by which a level of the analog signals output from the sensing circuit unit 330 is changed for a predetermined time to convert the changed amount into the digital signal $S_D$.

The operation unit 350 may determine whether a touch has occurred on the panel unit 310 based on the digital signal $S_D$. The operation unit 350 may determine the number of touches, coordinates of the touches, and the type of gesture of the touches or the like made on the panel unit 310, based on the digital signal $S_D$.

Figure 5:
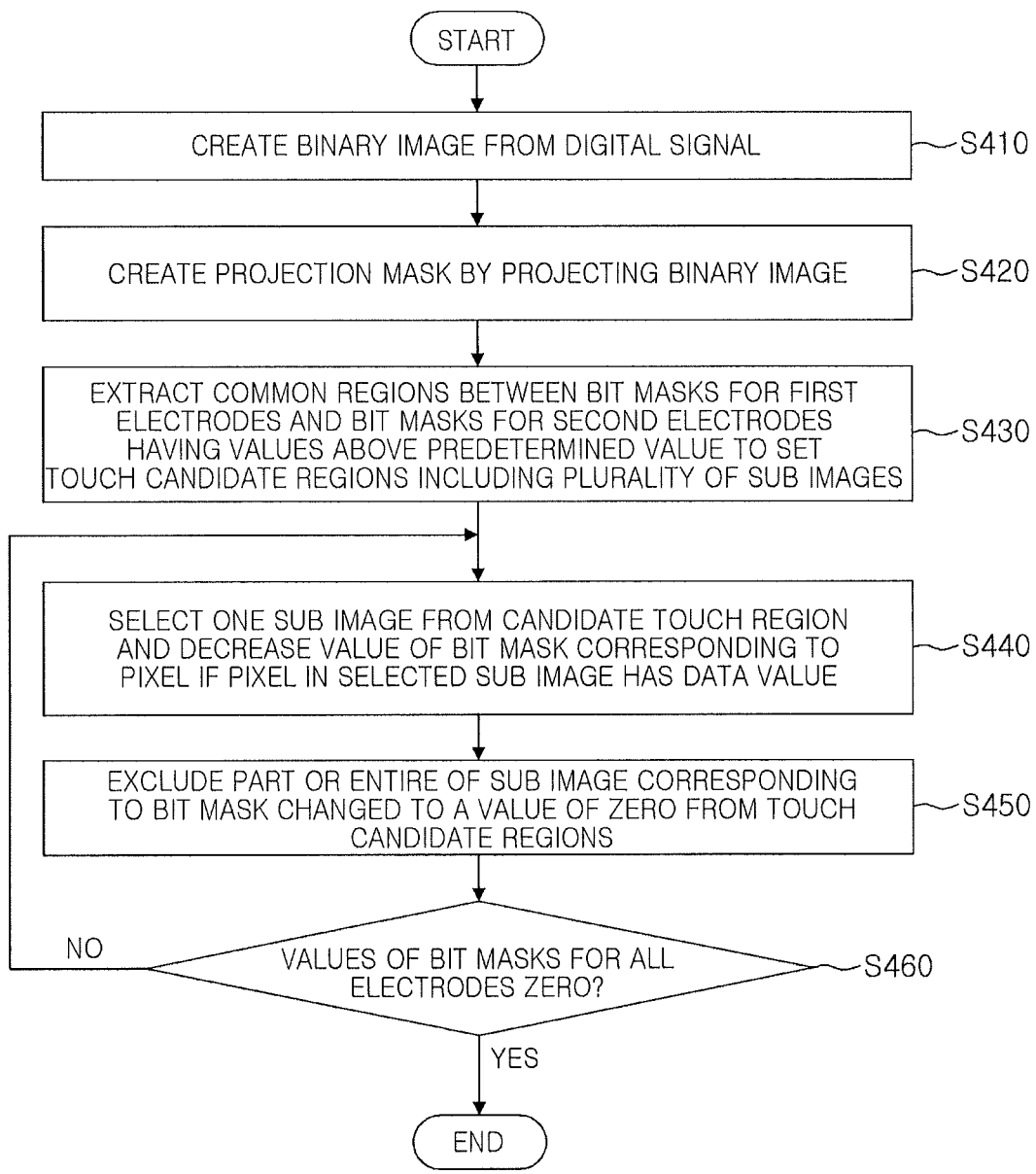
FIG. 5 is a flowchart illustrating a method of processing touch data according to the exemplary embodiment of the present disclosure.

FIG. 5 is a flowchart illustrating a method of processing touch data according to the exemplary embodiment of the present disclosure. FIGS. 6 through 10 are diagrams for illustrating the method of processing touch data according to the exemplary embodiment of FIG. 5. Hereinafter, referring to FIGS. 4 through 9, a method of processing a digital signal by the operation unit 350 will be described in detail.

Figure 6:
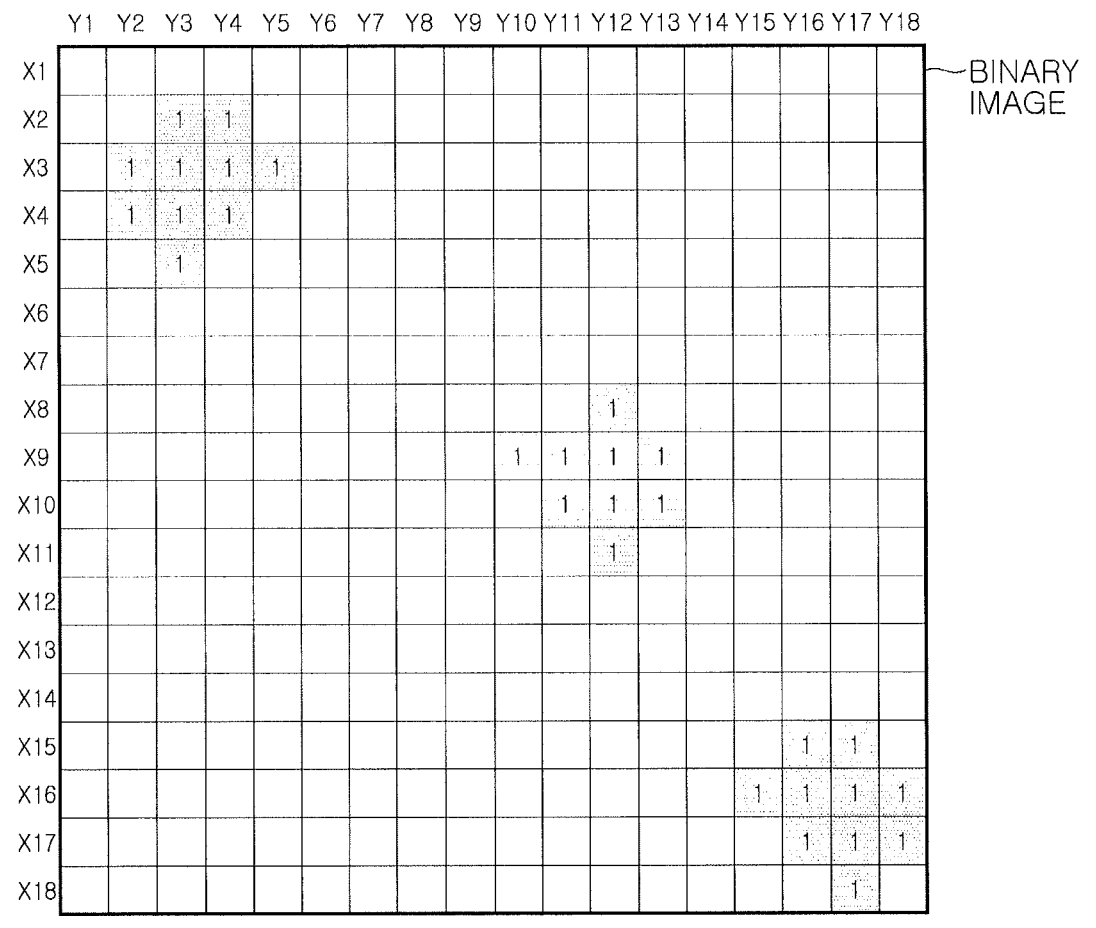

The operation unit 350 may create a binary image in a matrix form from a digital signal $S_D$ provided from the signal conversion unit 340 (S410). Assuming that eighteen first electrodes X1 to X18 and eighteen second electrodes Y1 to Y18 exist, the binary image as shown in FIG. 6 may be created, for example. Among pixels in the binary image, it is assumed that a pixel having a data value (reference numeral "1") indicates a region in which changes in capacitance above a predetermined reference level is detected, whereas a pixel having no data value indicates a region in which no change in capacitance above a predetermined reference level is detected.

After creating the binary image, the operation unit 350 may project the binary image onto every electrode to create a projection mask (S420). In this regard, projecting refers to counting the data values existing in the binary image in one of first and second directions for every electrode. The projecting is performed in the first direction for the first electrodes extending in the first direction while is performed in the second direction for the second electrodes extending in the second direction.

The projection mask is a set of bit masks corresponding to respective electrodes. In each of the bit masks, a count value calculated based on the projecting is masked. For example, when the binary image of FIG. 6 is projected onto the second first electrode X2 of the first electrodes, a bit mask having a value of 2 may be created, which corresponds to the second first electrode X2 of the first electrodes. Similarly, when the binary image of FIG. 6 is projected onto the third first electrode X3 of the first electrodes, a bit mask having a value of 4 may be created. By performing projecting onto every electrode in the above-described manner, a projection mask as shown in FIG. 7 may be created.

After creating the projection mask, the operation unit 350 may extract regions common among the bit masks in the first electrodes and the bit masks in the second electrodes above a value of 0, to create sub images (S430). The sub images represent touch candidate regions and are to be checked as to whether changes in capacitance are generated therein.

Figure 8:
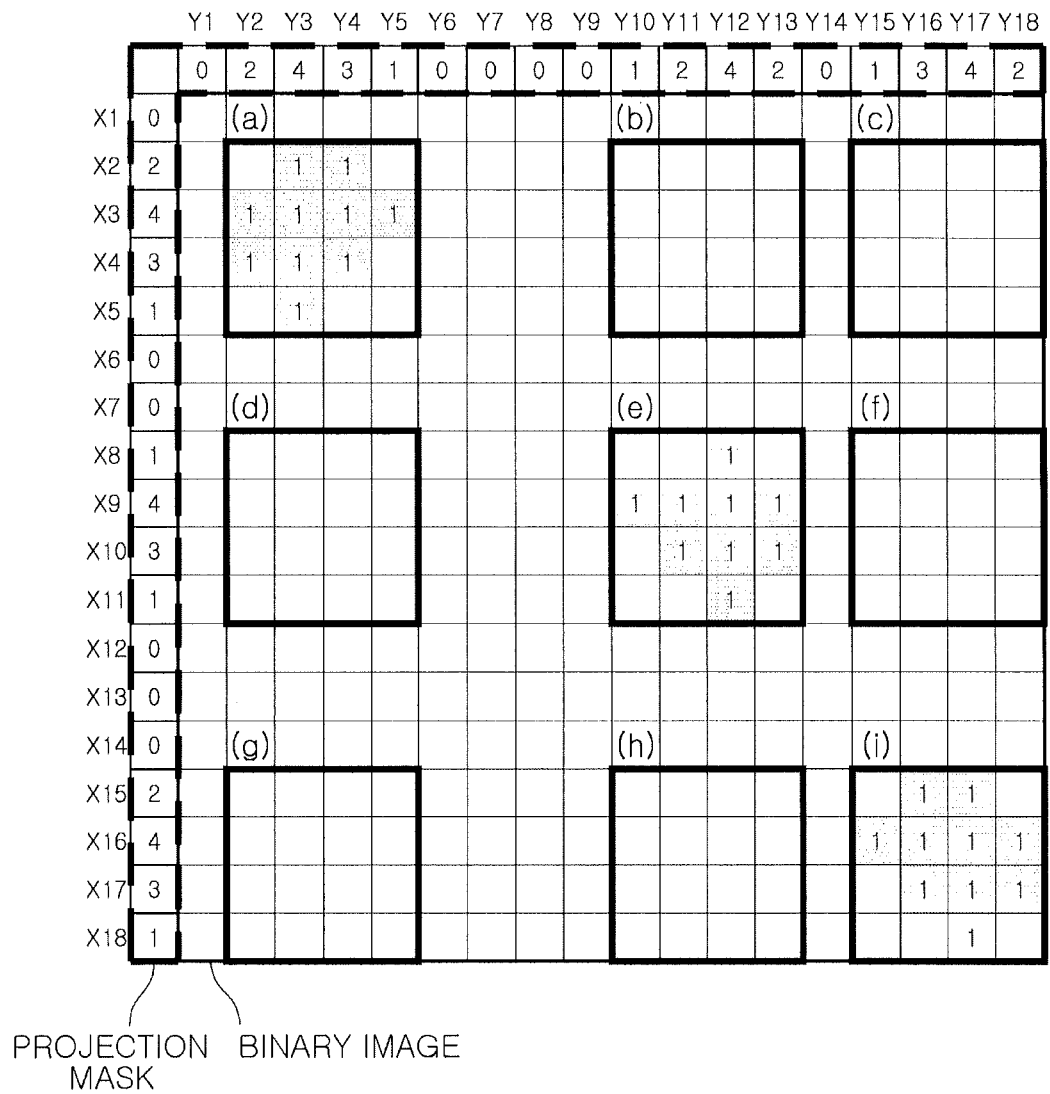

From the bit masks of FIG. 7, the bit masks for the second to the fifth ones X2 to X5, the eighth to the eleventh ones X8 to X11, and the fifteenth to the eighteenth ones X15 to X18 of the first electrodes and the second to fifth ones Y2 to Y5, the tenth to thirteenth one Y10 to Y13, and the fifteenth to eighteenth ones Y15 to Y18 of the second electrodes, which are above a value of 0, are extracted so as to create sub images (a) to (i) as shown in FIG. 8.

The operation unit 350 may select one from the sub images (a) to (i) and may determine whether a data value exists in the pixels in the selected sub image. If it is determined that there exists a data value, the operation unit 350 may decrease the value of the bit mask corresponding to the pixel in which the data value exists (S440).

The operation unit 350 may use touch information in the previous frame for the current frame in selecting a sub image from the plurality of sub images. Because a user's touch moves in a pattern, if a sub image is randomly selected from the plurality of sub images to be checked without considering the pattern, a time for detecting a touch may be increased.

Accordingly, the operation unit 350 according to the exemplary embodiment uses the touch information detected in the previous frame for the current frame, such that sub images which determine that touches have been made in the previous frame are first checked. For example, if a touch is detected in the sub image (a) of FIG. 8 in the previous frame, the operation unit 350 may check the sub image (a) first in the current frame. In addition, if multiple touches are detected in the previous frame, the operation unit 350 may check the sub images existing in the region in which multiple touches are detected first in the current frame.

Figure 9:
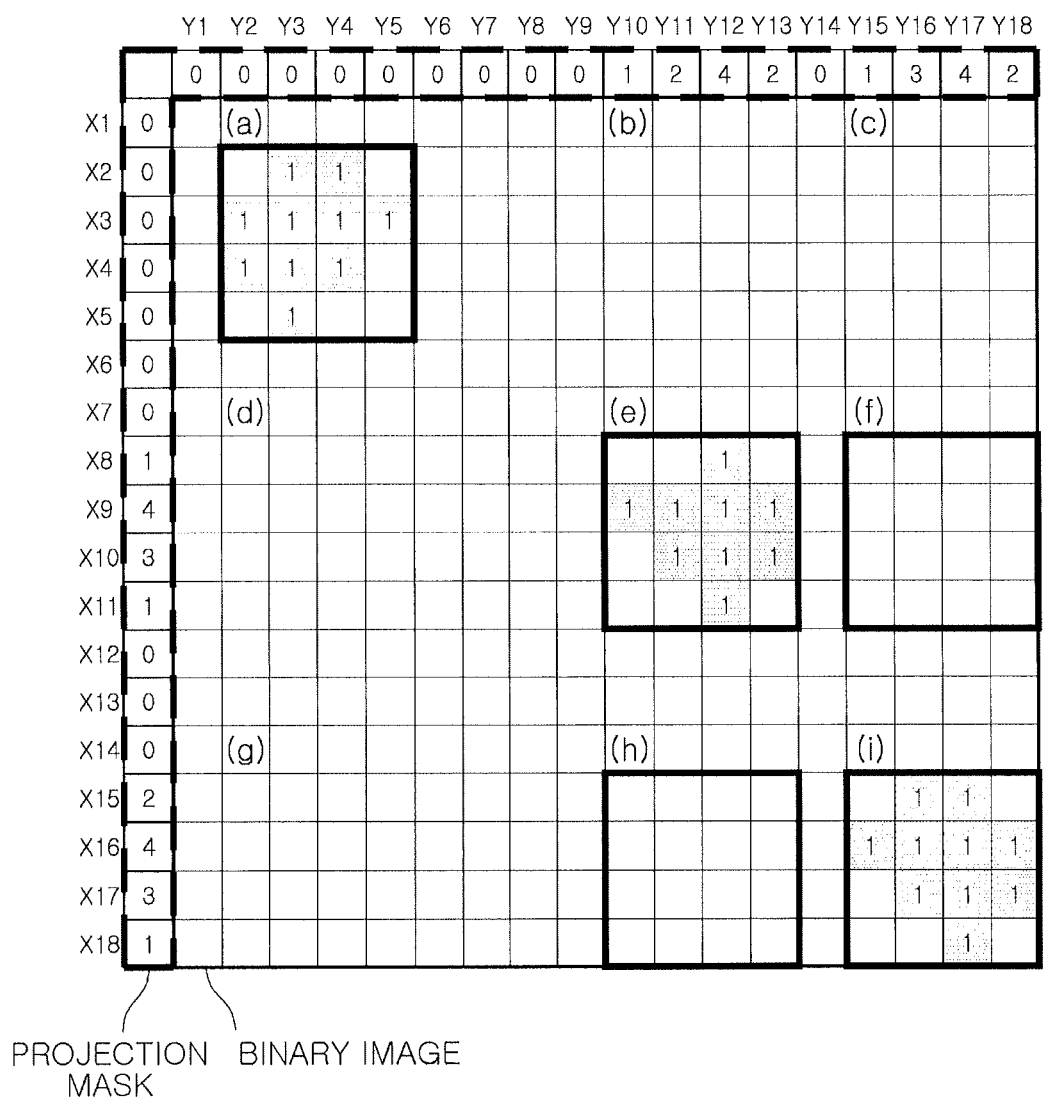

In FIG. 8, if the sub image (a) is selected, all of the pixels in the sub image are checked as to whether a data value exists. In FIG. 8, the pixel at the intersection of the third first electrode X3 of the first electrodes and the second first electrode Y2 of the second electrodes has a data value, such that the values of the bit masks corresponding to the third first electrode X3 of the first electrodes and the second first electrode Y2 of the second electrodes are decreased by one. Similarly, the pixel at the intersection of the fourth first electrode X4 of the first electrodes and the second first electrode Y2 of the second electrodes has a data value, such that the values of the bit masks corresponding to the fourth first electrode X4 of the first electrodes and the second first electrode Y2 of the second electrodes are decreased by one. By checking all of the pixels in the sub image (a) in the above-described manner, the values of the bit masks for the second to the fifth ones X2 to X5 of the first electrodes and for the second to the fifth one Y2 to Y5 of the second electrodes may be decreased as shown in FIG. 9.

The operation unit 350 may determine that a touch has occurred in a pixel having a data value in the sub image (a), based on a result of checking the sub image (a).

If the value of a bit mask is changed to zero as a result of the checking the sub image, the operation unit 350 may exclude a part or the entire of the sub image corresponding to the bit mask changed to value of 0 from the touch candidate regions (S450). In the example shown in FIG. 9, the operation unit 350 may exclude the sub images (b), (c), (d) and (g) from checking.

Figure 10A:
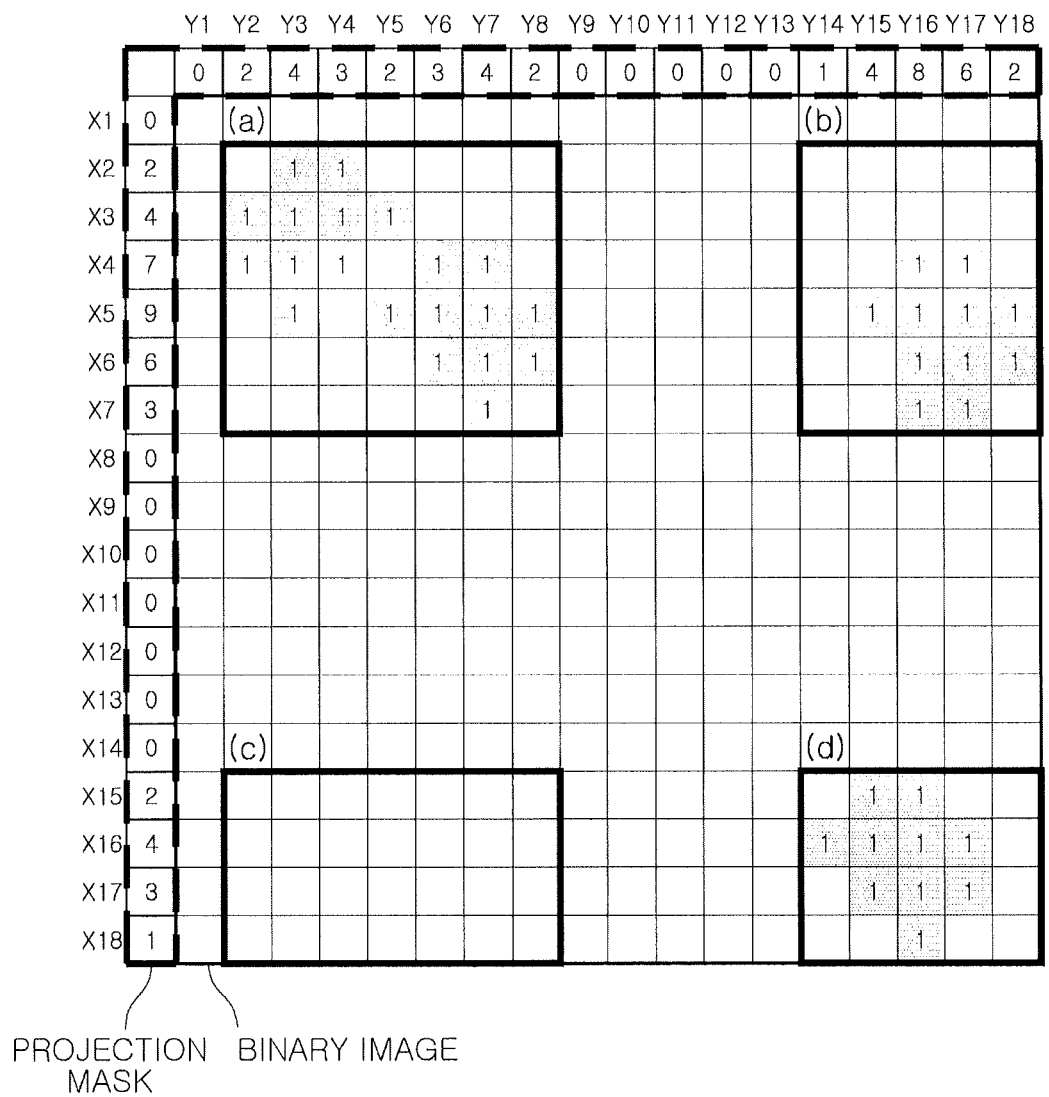
Figure 10B:
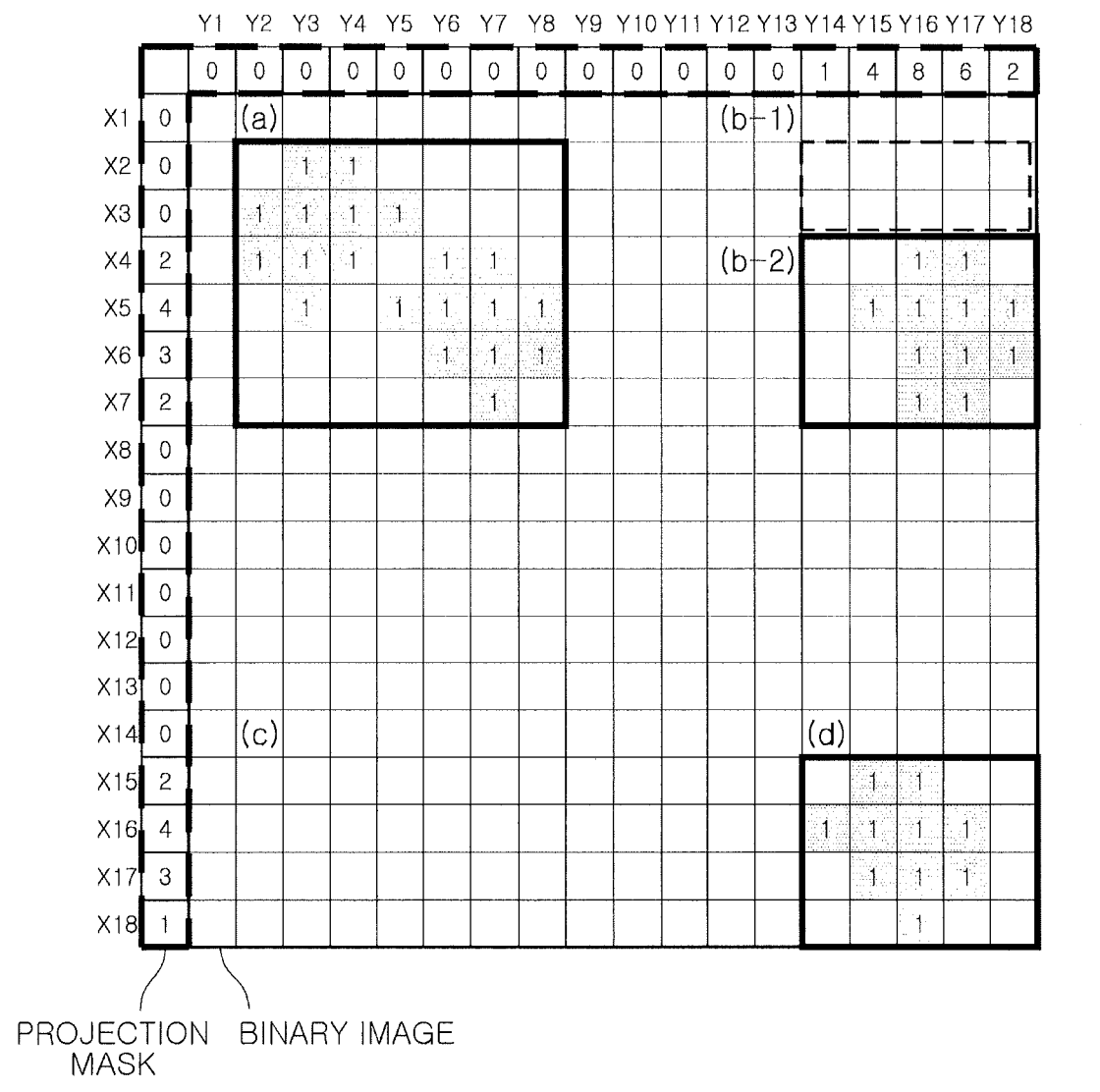

If a projection mask is created as shown in FIG. 10A, the bit masks for the second to the eighth ones Y2 to Y8 of the second electrodes have been changed to value of 0 as a result of checking the sub image (a), and thus the entirety of the sub image (c) is excluded from being checked. Further, for the second to the seventh ones X2 to X7 of the first electrodes, the bit masks for only the second and the third first electrodes X2 and X3 of the first electrodes have been changed to value of 0, and thus a part (b–1) of the sub image (b) is excluded from touch candidate regions while the rest of the region (b–2) may remain as a candidate touch region, as shown in FIG. 10B.

Then, the operation unit 350 may determine whether the values of bit masks for all of the electrodes are zero, and, if the values are not zero, may repeat the operations S440 and S450 on the sub images remaining as touch candidate regions (S460).

In the example shown in FIG. 9, since not all of the values of the bit masks for all of the electrodes are zero, one of the sub images (e), (f), (h) and (i) remaining after excluding the checked sub image (a) and the excluded sub images (b), (c), (d) and (g) may be selected. If the sub image (e) is selected, the sub images (f) and (g) may be excluded from being checked. If the sub image (e) is checked, the values of the bit masks for the fifteenth to eighteenth first electrodes X15 to X18 of the first electrodes and the fifteenth to eighteenth first electrodes Y15 to Y18 are not zero, and thus the sub image (i) is selected again and to be checked. As a result of checking the sub image (i), the values of the bit masks for all of the electrodes are changed to zero, it is determined that all of the sub images have been checked, and thus the checking may be finished.

According to the exemplary embodiment, it may be possible to quickly determine whether a touch has occurred by way of decreasing values of bit masks corresponding to a sub image having a data value as a result of checking sub images and excluding a part or some the sub images corresponding to bit masks having a value changed to zero instead of checking all of the sub images set to be checked.

Figure 11:
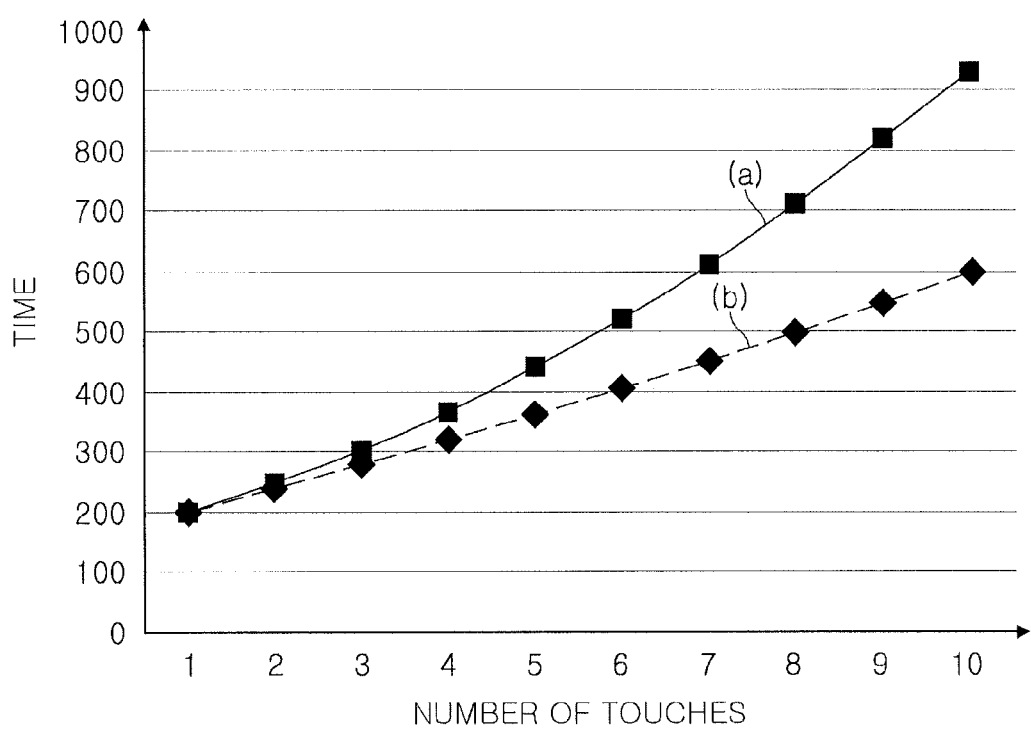
FIG. 11 is a graph illustrating simulation results of a method of processing touch data according to an exemplary embodiment of the present disclosure.

FIG. 11 is a graph illustrating simulation results of a touch-screen device according to an exemplary embodiment of the present disclosure. In FIG. 11, the graph (a) represents a simulation result when all of the sub images have been checked, and the graph (b) represents a simulation result when a part or some of the sub images have been excluded from being checked as values of bit masks is decreased. As can be seen from FIG. 11, differences in time for detecting touches of the graph (a) and the graph (b) become larger as the number of touches increases.

As set forth above, according to exemplary embodiment of the present disclosure, touch candidate regions are calculated according to data values existing in a binary image and it may be quickly determined whether a touch has occurred by checking only some of the touch candidate regions instead of checking all of the touch candidate regions.

While exemplary embodiments have been shown and described above, it will be apparent to those skilled in the art that modifications and variations could be made without departing from the spirit and scope of the present disclosure as defined by the appended claims.

What is claimed is:

1. A touchscreen device, comprising:
a panel unit including rows of first electrodes extending in a first direction and columns of second electrodes extending in a second direction intersecting the first direction;
a sensing circuit unit sensing changes in capacitance in intersections of the first electrodes and the second electrodes;
a signal conversion unit converting the changes in capacitance into a digital signal; and
an operation unit creating a binary image in a matrix form having rows of the first electrodes and columns of the second electrodes based on the digital signal, and projecting the binary image onto every first electrode and every second electrode in the first and second directions, respectively, to create a projection mask including a plurality of bit masks, the operation unit selecting as touch candidate regions a plurality of sub images consisting of common regions between the bit masks for the first electrodes having a value of 1 or higher and the bit masks for the second electrodes having a value of 1 or higher, to determine whether a touch has occurred.

2. The touchscreen device of claim 1, wherein the operation unit selects one sub image from the plurality of sub images, checks all pixels in the selected sub image, and, if a pixel has a data value, decreases a value of a bit mask corresponding to the pixel.

3. The touchscreen device of claim 2, wherein the operation unit decreases values of bit masks for the first electrode and for the second electrode corresponding to the pixel.

4. The touchscreen device of claim 2, wherein the operation unit selects one sub image from the plurality of sub images based on touch information in a previous frame.

5. The touchscreen device of claim 2, wherein the operation unit checks pixels in the selected sub images and determines the selected sub image as a touch region if a data value exists in a pixel.

6. The touchscreen device of claim 5, wherein the operation unit checks pixels in the selected sub image and, if a data value exists in a pixel, determines that a touch has occurred at an intersection of the first electrodes and the second electrodes which correspond to the pixel.

7. The touchscreen device of claim 2, wherein the operation unit, if a value of at least one of the plurality of the bit masks is changed to zero, excludes a part or the entire of at least one sub image corresponding to the bit mask from the touch candidate regions.

8. A method of processing touch data, the method comprising:
creating a binary image based on changes in capacitance generated in intersections of rows of first electrodes extending in a first direction and columns of second electrodes extending in a second direction intersecting the first direction;
projecting the binary image onto every first electrode and every second electrode in the first and second directions, respectively, to create a projection mask including a plurality of bit masks;
selecting as touch candidate regions a plurality of sub images corresponding to common regions between the bit masks for the first electrodes having a value of 1 or higher and the bit masks for the second electrodes having a value of 1 or higher in the projection mask; and
determining whether a touch has occurred by checking pixels in the touch candidate regions to determine if a data value exists therein.

9. The method of claim 8, wherein the creating of the binary image includes creating the binary image based on a digital signal converted from the changes in capacitance.

10. The method of claim 8, wherein the binary image is in a matrix form having rows of the first electrodes and columns of the second electrodes.

11. The method of claim 8, wherein the determining whether a touch has occurred includes:
selecting a sub image from the touch candidate regions; and
if a data value exists in a pixel in the selected sub image, decreasing a value of a bit mask corresponding to the pixel.

12. The method of claim 11, wherein the determining whether a touch has occurred further includes, if a value of at least one of the plurality of the bit masks is changed to zero, excluding a part or the entire of at least one sub image corresponding to a bit mask having a value changed to zero from the touch candidate regions.

13. The method of claim 12, wherein the determining whether a touch has occurred further includes determining whether values of all of the plurality of the bit masks have been changed to zeros.

14. The method of claim 13, wherein the determining whether a touch has occurred further includes, if at least one of the plurality of bit masks has value of 1 or higher, repeating the selecting of the sub image and the decreasing of the value of the bit mask.

15. The method of claim 11, wherein the decreasing of the value of the bit mask includes decreasing values of bit masks for the first electrode and for the second electrode corresponding to the pixel.

16. The method of claim 11, wherein the selecting of the sub image includes selecting one sub image from the plurality of sub images based on touch information in a previous frame.

* * * * *